United States Patent [19]
Adamski et al.

[11] Patent Number: 5,912,276
[45] Date of Patent: Jun. 15, 1999

[54] PROCESS TO PREPARE LOW DENSITY POROUS CROSS-LINKED POLYMERIC MATERIALS

[75] Inventors: Robert Paul Adamski, Missouri City; Sharon Marie Beshouri; Virittamulla Gamage Chamupathi, both of Houston, all of Tex.

[73] Assignee: Shell Oil Company, Houston, Tex.

[21] Appl. No.: 08/836,779

[22] PCT Filed: May 27, 1997

[86] PCT No.: PCT/US97/09007

§ 371 Date: Jul. 21, 1997

§ 102(e) Date: Jul. 21, 1997

[87] PCT Pub. No.: WO97/45456

PCT Pub. Date: Dec. 4, 1997

Related U.S. Application Data

[60] Provisional application No. 60/018,892, May 30, 1996.

[51] Int. Cl.[6] ...................................................... C08G 9/28
[52] U.S. Cl. ................................ 521/64; 521/62; 521/63; 521/149; 521/150; 604/358; 604/369
[58] Field of Search ................................... 521/62, 63, 64

[56] References Cited

U.S. PATENT DOCUMENTS

| | | | |
|---|---|---|---|
| 4,522,953 | 6/1985 | Barby et al. | 521/64 |
| 5,189,070 | 2/1993 | Brownscombe et al. | 521/64 |
| 5,200,433 | 4/1993 | Beshouri | 521/64 |
| 5,210,104 | 5/1993 | Bass et al. | 521/64 |
| 5,306,733 | 4/1994 | Adamski et al. | 521/64 |
| 5,314,420 | 5/1994 | Smith et al. | 521/64 |
| 5,334,621 | 8/1994 | Beshouri | 521/64 |
| 5,340,842 | 8/1994 | Adamski et al. | 521/64 |
| 5,362,761 | 11/1994 | Uragami et al. | 521/64 |
| 5,362,762 | 11/1994 | Beshouri | 521/64 |
| 5,399,591 | 3/1995 | Smith et al. | 521/64 |
| 5,583,162 | 12/1996 | Li et al. | 521/63 |
| 5,646,193 | 7/1997 | Brownscombe et al. | 521/64 |
| 5,760,097 | 6/1998 | Li et al. | 521/64 |

FOREIGN PATENT DOCUMENTS 4016-194  1/1992  Japan.

*Primary Examiner*—Morton Foelak
*Attorney, Agent, or Firm*—Del S. Christensen

[57] ABSTRACT

Stable high internal phase water-in-oil emulsions containing polymerizable vinyl monomers, crosslinking monomers and initiators are obtained useful in producing low density porous crosslinked polymeric materials by using a surfactant system containing (a) one or more sorbitan fatty acid esters or saccharide fatty acid esters or mixtures thereof and (b) one or more quaternary salts having one or more greater than or equal to 8 carbon atom hydrocarbon groups. A water-in-oil emulsion can be formed with lower surfactant concentration than sorbitan fatty acid ester alone and improved surfactant performance at elevated temperatures is obtained. Sludge formation otherwise observed with the use of sorbitan fatty acid ester surfactants is also reduced or eliminated.

16 Claims, No Drawings

PROCESS TO PREPARE LOW DENSITY POROUS CROSS-LINKED POLYMERIC MATERIALS

This application claims the benefit of U.S. Provisional application No. 60/018,892, filed May 30, 1996.

TECHNICAL FIELD

This invention relates to a process to prepare low density, porous, crosslinked, polymeric materials. In one aspect, the invention relates to improved surfactant systems for a high internal phase emulsion polymerization process to manufacture low density porous crosslinked polymeric materials.

BACKGROUND ART

Polymeric foams can be generally classified as either closed-cell foams or as open-cell foams. Open-cell foams can be used as a matrix to contain various liquids and gases. They are capable of various industrial applications such as, for example, use in wipes and diapers, as carriers and ion exchange resins. For some of these applications, it is desirable to have porous crosslinked polymer blocks which have a very low density and a high capacity of absorbing and retaining liquids. Such high absorption capacity, low density, porous polymer blocks can be prepared by polymerizing a specific type of water-in-oil emulsion known as high internal phase emulsion (HIPE) having relatively small amounts of a continuous oil phase and relatively greater amounts of an internal water phase.

Such high absorption capacity, low density foams are prepared in U.S. Pat. No. 4,522,953 by polymerizing and crosslinking the monomers in the continuous oil phase of a high internal phase water-in-oil emulsion with a polymerization initiator such as potassium persulfate. Generally, these high internal phase water-in-oil emulsions contain at least 90 weight percent of an aqueous liquid as the internal phase. The high ratio water-in-oil emulsions are formed by combining the oil phase with water under moderate shear. In order to obtain this high internal phase water-in-oil emulsion, a surfactant must be used to stabilize the emulsion.

One class of surfactants used to produce foams by such processes are sorbitan fatty acid esters. Commercial sorbitan fatty acid esters are a combination of mono-, di-, tri-, and tetra-fatty acid esters of sorbitan $C_6(H_2O)_5H_2$, as well as mono- and di-fatty acid esters of isosorbide $C_6(H_2O)_4H_2$ and polyol impurities. Commercial sorbitan fatty acid ester surfactants form an undesirable water soluble sludge when these surfactants are dissolved in an oil phase. It has been found that polyols such as sorbitan and isosorbide are the main components of the sludge. The sludge must be removed before the surfactant in the oil phase is used to prepare an emulsion in order to prevent plugging of the mixing equipment. Thus, it is advantageous to reduce the sludge concentration in the oil phase containing sorbitan fatty acid ester surfactants.

The stability of the emulsion is directly tied to the surface activity of the emulsifier. A robust emulsifier will stabilize emulsions up to high (30:1) water:oil ratios. A poor emulsifier will not form stable emulsions, and at high water to oil ratios the emulsion will degrade by not incorporating water, and eventually break completely.

One method of enhancing the emulsifier is to combine different sorbitan fatty acid esters as reported in U.S. Pat. No. 5,200,433. However, it is desirable to further enhance the emulsion stability to obtain higher ratio water-in-oil emulsion increasing the overall absorption capacity.

Further, relatively large amounts of sorbitan fatty acid ester surfactants are required to prepare the high internal phase emulsions. To stabilize an emulsion consisting of 30 parts aqueous phase dispersed in 1 part oil phase by volume, a 10 percent by weight or greater concentration of sorbitan fatty acid ester surfactant in the oil phase is generally needed. The use of such a large amount of surfactant is undesirable since it increases the raw material cost of producing a foam. Thus, it is desirable to be able to form a stable emulsion with less surfactants.

Further, some sorbitan fatty acid ester surfactants, such as sorbitan monolaurate, are not effective emulsifiers at elevated temperatures. However, it is desirable to be able to use these surfactants to prepare high internal phase emulsions at elevated temperatures.

It is therefore an object of the present invention to provide a more effective surfactant system for the preparation of a high internal phase water-in-oil emulsion useful for preparing low density crosslinked polymeric materials.

DESCRIPTION OF THE INVENTION

According to the invention, a process for the production of a porous crosslinked polymeric material is provided, comprising the steps of:
(a) providing a water-in-oil emulsion comprising (i) a mixture of polymerizable monomers comprising at least one oil-soluble vinyl monomer and from about 2 to about 70 weight percent, based on the mixture, of at least one multifunctional unsaturated crosslinking monomer, (ii) at least 90 weight percent, based on the emulsion, of water as the internal phase (iii) a surfactant comprising (A) one or more sorbitan fatty acid ester and/or saccharide fatty acid ester and (B) at least one quaternary salt having at least one greater than or equal to 8 carbon atoms hydrocarbon group, and (iv) a polymerization initiator; and
(b) heating the water-in-oil emulsion under conditions effective to polymerize and crosslink the polymerizable monomers. The curable high internal phase water-in-oil emulsion is also provided.

DETAILED DESCRIPTION OF THE PREFERRED EMBODIMENTS

It has been found that by adding a quaternary salt having at least one greater than or equal to 8 carbon atoms hydrocarbon group as a surfactant additive to the sorbitan fatty acid ester or saccharide fatty acid ester surfactant in a curable high internal phase water-in-oil emulsion increases emulsion stability such that higher water to oil ratio emulsions are achievable with less surfactant concentration. These stable curable high internal phase water-in-oil emulsions are useful in forming low density porous crosslinked polymeric materials (hereinafter "foam"). These foams generally have a dry density of less than about 0.1 g/cc.

In one embodiment of the inventive process, a foam is produced by first forming a curable water-in-oil high internal phase emulsion by gradually adding and mixing an aqueous solution optionally containing an electrolyte into a monomer solution (oil phase) containing a mixture of polymerizable monomers and the surfactant mixture containing (a) one or more sorbitan fatty acid ester, saccharide fatty acid ester, or a mixture thereof and (b) one or more quaternary salts having one or more greater than or equal to $C_8$ hydrocarbon group directly or indirectly attached to the quaternary cation head group. A polymerization initiator is also added either in the monomer solution or the aqueous solution before mixing or after formation of the emulsion depending on the desired process conditions. The curable water-in-oil high internal phase emulsion is cured (polymerized and crosslinked) by heating the emulsion at a temperature of at least about 25° C. for a time effective to cure the monomers.

The mixture of polymerizable monomers generally contains one or more vinyl monomers and one or more crosslinking agents. Various monomers may be used in the preparation of the foams, provided the monomers can be dispersed in or form an oil phase of a water-in-oil high internal phase emulsion (oil-soluble) and have a polymerizable vinyl group. Suitable vinyl monomers include, for example, monoalkenyl arene monomers such as styrene, α-methylstyrene, chloromethylstyrene, vinylethylbenzene and vinyl toluene; acrylate or methacrylate esters such as 2-ethylhexyl acrylate, n-butyl acrylate, isobutyl acrylate, t-butyl acrylate, hexyl acrylate, n-butyl methacrylate, lauryl methacrylate, and isodecyl methacrylate; conjugated diolefins such as butadiene, isoprene, and piperylene; allenes such as allene, methyl allene and chloroallene; olefin halides such as vinyl chloride, vinyl fluoride and polyfluoro-olefins; and mixtures thereof.

Suitable crosslinking agents can be any multifunctional unsaturated monomers capable of reacting with the vinyl monomers. The crosslinking agents contain at least two functionalities. The functionality can be, for example, vinyl groups, acrylate groups and methacrylate groups. Multifunctional unsaturated crosslinking monomers include, for example, difunctional unsaturated crosslinking monomers such as divinyl benzene, diethylene glycol dimethacrylate, 1,3-butanediol dimethacrylate, and allyl methacrylate and tri-, tetra- and penta-functional unsaturated crosslinking monomers such as trimethylolpropane trimethacrylate, pentaerythritol tetramethacrylate, trimethylolpropane triacrylate, and pentaerythritol tetraacrylate, glucose pentaacrylate, glucose diethylmercaptal pentaacrylate, and sorbitan triacrylate; and poly-functional unsaturated crosslinking monomers such as polyacrylates (eg. sucrose per(meth)acrylate and cellulose (meth)acrylate). Crosslinking monomers are typically present in an amount of from about 2 weight percent to about 70 weight percent, preferably from about 5 weight percent to about 40 weight percent based on the total monomer mixture. Some of these crosslinking monomers can be incorporated as a non-crosslinked monomer as long as at least about 2 weight percent of the crosslinking monomers are crosslinked.

Suitable polymerization initiators can be water-soluble or oil-soluble. Water-soluble initiators include, for example, persulfates such as potassium or sodium persulfate and various redox systems such as ammonium persulfate together with sodium metabisulfite. Oil soluble (monomer soluble) initiators include, for example, azo compounds such as azobisisobutyronitrile (AIBN); and peroxides such as benzoyl peroxide, methyl ethyl ketone peroxide, alkylperoxycarbonates such as di-2-ethylhexyl peroxydicarbonate and di(sec-butyl)peroxydicarbonate and alkylperoxycarboxylates such as t-butyl peroxyisobutyrate, 2,5-dimethyl-2,5-bis(2,3-ethylhexanoylperoxy)hexane, and t-butyl peroctoate. The preferred water-soluble polymeriation initiator is potassium persulfate and the preferred oil-soluble polymerization initiators are alkylperoxyarbonates and alkylperoxycarboxylates for fast curing time.

Most preferable alkylperoxycarbonates are branched at the 1-carbon position and most preferable alkylperoxyarboxylates are branched at the α-carbon position and/or 1-carbon position. These branched alkylperoxycarbonate peroxide can be represented by the formula:

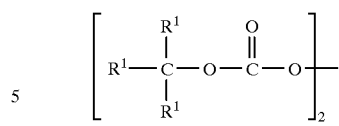

where $R^1$ is independently $C_1$ to $C_{16}$ hydrocarbons or hydrogen in which at least two of the $R^1$ are hydrocarbon groups.

The preferred branched alkyl carboxylate peroxide can be represented by the formula:

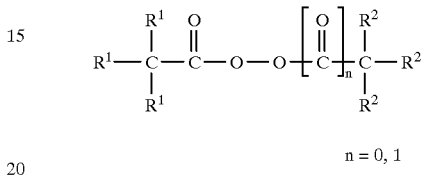

$$n = 0, 1$$

where $R^1$ and $R^2$ are independently $C_1$ to $C_{16}$ hydrocarbon groups or hydrogen in which at least two of the $R^1$ or $R^2$ are hydrocarbon groups. Preferably at least two of both $R^1$ and $R^2$ are hydrocarbon groups. Hydrocarbon groups can be alkyl, alkenyl or aryl groups.

The water-soluble initiators and/or oil-soluble initiators should be present in an effective amount to cure (polymerize and to crosslink) the monomers. Typically the initiator can be present from about 0.005 to about 15 weight percent based on the monomers. The initiators can be introduced with the oil phase or the aqueous phase before or after formation of the high internal phase emulsion.

A water-soluble initiator such as potassium persulfate can be added to the aqueous solution before forming the emulsion or to the emulsion. An oil-soluble initiator can be added to the monomer solution or an advanced monomer solution or to the emulsion. Addition of a polymerization initiator to an high internal phase water-in-oil emulsion is described in U.S. Pat. No. 5,210,104, the disclosure of which is herein incorporated by reference. The initiator added to the emulsion can optionally be blended into the emulsion by any blending technique such as, for example, static mixer or a pin mixer at a low shear rate, to form a curable water-in-oil high internal phase emulsion. The rate of shear must be high enough to blend the initiator but low enough not to allow the emulsion to coalesce or liquify.

Initiators can be added to the oil phase (monomer phase) or aqueous phase prior to formation of the emulsion. Alternatively, at least a portion of the monomer solution can be advanced (partially polymerized) in the presence of an effective amount of an advancement initiator or by a free-radical-producing radiation source to produce an advanced monomer component prior to formation of the emulsion to reduce curing time.

The surfactant used in making the high internal phase emulsion which is to be polymerized is important in forming water-in-oil high internal phase emulsion and the final properties of the foams obtained. The surfactants are typically added to the monomer phase (oil phase). In the inventive process, the surfactant system contains component (a) at least one saccharide fatty acid ester or a sorbitan fatty acid ester (can be a mixture thereof) and component (b) at least one quaternary salt having one or more greater than or equal to $C_8$ hydrocarbon groups.

The preferred sorbitan fatty acid esters for component (a) is a fatty acid ester of a sorbitan having the formula $C_6(H_2O)_5H_2$. Preferably the sorbitan fatty acid esters have at least one fatty acid ester moiety having $C_8$ to $C_{30}$ hydrocarbyl segment, more preferably $C_{12}$ to $C_{20}$ hydrocarbyl segment. These hydrocarbyl segments can be alkyl (straight or branched), aryl, cyclic or arylalkyl. The fatty acid esters can contain other inert substituents. The preferred sorbitan fatty acid esters include, for example, sorbitan monooleate, sorbitan monolaurate, sorbitan monopalmitate, sorbitan trioleate, sorbitan monostearate and sorbitan tristearate. Commercially available sorbitan fatty acid ester surfactants include, for example, SPANS emulsifying agents 20, 40, 60, 65, 80 and 85 (from Fluka Chemical Corp. or Aldrich Chemical Co.), EMSORB 2502 (from Henkel) and ALKA-MULS® sorbitan esters SML, SMO, SMS, STO (from Alkaril Chemicals Ltd.) among others. A combination of sorbitan esters such as a combination of SPANS 20 and 40 emulsifying agents can also be used. In particular when a hydrophilic foam is desired, one or more sorbitan fatty acid ester is preferred.

For component (a), saccharide fatty acid ester surfactant can be monosaccharides or oligosaccharides. Monosaccharides are polyhydroxy aldehydes or ketones having the general chemical formula $C_n(H_2O)_n$ where n is 3, 4, 5, 6, 7, 8, 9 or 10. Examples of monosaccharides where n is 6 are D-glucose, D-fructose, D-mannose and D-galactose. Oligosaccharides are combinations of two or more saccharides joined by O-glucoside linkages having the general chemical formula $C_m(H_2O)_{m-r}$ where m is an integer from 6 to 40 and r is the number of O-glucoside linkages (or number of monosaccharide molecules that form the oligosaccharide minus one). Examples of commonly occurring disaccharides are sucrose (D-glucose plus D-fructose), lactose (D-galactose plus D-glucose), and maltose (D-glucose plus D-glucose). Each of these molecules have the general chemical formula $C_{12}(H_2O)_{11}$. Raffinose is an example of a commonly occurring trisaccharide (D-glucose plus D-fructose plus D-galactose) and has the chemical formula $C_{18}(H_2O)_{16}$.

Monosaccharides and oligosaccharides can be partially esterified with fatty acids to obtain the saccharide fatty acid esters. One method to esterify saccharides is by transesterification between the saccharide and an ester, whereby an acyl group is transferred to saccharide in the presence of a basic catalyst, eg, potassium carbonate. For a typical saccharide, esterification with fatty acid esters preferably occurs at the methyl hydroxy side chain groups and the saccharide fatty acid esters produced can contain a mixture of esters. For example, sucrose fatty acid esters can contain a mixture of the mono-, di-, tri- esters.

The preferred saccharide fatty acid ester is a fatty acid ester of a saccharide having the formula $C_n(H_2O)_{n-r}$, wherein r is an integer from 0 to 3 and $3(r+1) \leq n \leq 10(r+1)$ (n is an integer from 3 to 40, more preferably from 3 to 32). More preferably the saccharide segment of the surfactant is a monosaccharide (r=0), disaccharide (r=1), trisaccharide (r=2). Preferably the saccharide fatty acid esters have at least one fatty acid ester moiety having $C_8$ to $C_{30}$ hydrocarbyl segment, more preferably $C_{12}$ to $C_{20}$ hydrocarbyl segment. These hydrocarbyl segments can be alkyl (straight or branched), aryl, cyclic or arylalkyl. The fatty acid esters can contain other inert substituents. Preferred monosaccharide and oligosaccharide fatty acid ester surfactants for preparing high internal phase, water-in-oil emulsions have ester values within the range of about 100 to about 250 mg KOH/g and hydroxyl values are within the range of about 100 to about 500 mg KOH/g. Foams containing saccharide fatty acid ester surfactants are generally hydrophobic.

Some specific examples of commercially available saccharide fatty acid ester surfactants are Crodesta F-50 emulsifying agent (sucrose distearate from Croda Inc.) and Crodesta F-110 emulsifying agent (sucrose mono-,di-stearate from Croda Inc.). Some other suitable fatty acid esters are sucrose dilaurate, sucrose dioleate, sucrose dipalmitate, fructose monopalmitate, fructose dipalmitate, glucose monodecanoate, glucose monooctanoate, glucose dioctanoate, lactose dilaurate, maltose monolaurate, maltose dilaurate, mannose monodecanoate, mannose didecanoate, arabitol fatty acid esters, mannitol fatty acid esters, xylitol fatty acid esters, erythritol monooleate, mannitol monolaurate, and xylitol dioleate.

Partially alkylated derivatives of the above mentioned monosaccharide and oligosaccharide fatty acid ester surfactants can also be used and are included in the definition of saccharide fatty acid ester surfactants. In the alkylated derivatives, the hydroxyl positions of the monosaccharide or oligosaccharide fatty acid ester are partially alkylated with a lower alkyl group, preferably $C_{1-6}$, more preferably $C_{1-3}$, and most preferably $C_1$ alkyl group (i.e, methylated). For example, the methylated derivatives are methylated in the hydroxyl positions of the saccharides. These alkyl saccharide fatty acid esters can be used as mixtures with non-alkylated saccharide fatty acid esters or with sorbitan fatty acid esters. These alkyl saccharide fatty acid esters (or saccharide fatty acid ethers) are known, for example, in Japanese patent specification 04016194-A and Adelhorst, K. et al., Synthesis, (2), 112–15 (1990). Some specific examples of commercially available surfactants are Glucate® SS (methyl glucose sesquistearate from Amerchol Corp.), Glucate® DO (methyl glucose dioleate from Amerchol Corp.), Grillocose PS (methyl glucose stearate from R.I.T.A. Corp.) and Grillocose IS (methyl glucose isostearate from R.I.T.A. Corp.) emulsifying agents. Some other preferred alkyl saccharide fatty acid esters include ethyl glucopyranoside didodecanoate, ethyl glucopyranoside dioctadecanoate, ethyl galactopyranosyl glucopyranoside didodecanoate, ethyl galactopyranosyl glucopyranoside monododecanoate, methyl mannoside didodecanoate.

The component (a) can also contain one or more sorbitan fatty acid ester in addition to the saccharide fatty acid ester. For example, a combination of sucrose difatty acid ester (e.g. sucrose distearate) and a sorbitan fatty acid ester (e.g. sorbitan monolaurate) can be used as component (a) of the surfactant.

The component (b) is a quaternary salt having one or more cation head groups and one or more hydrocarbon tail groups. The hydrocarbon tail group is preferably greater than or equal to $C_8$, preferably about $C_8$–$C_{10}$, more preferably about $C_{10}$–$C_{20}$ hydrocarbon group directly or indirectly attached to the quaternary cation head group. The quaternary cation head group can be any heteroatom-containing head group, particularly Group VA of the periodic table (CAS system), having positive charge such as ammonium and phosphonium ions. Preferably, the heteroatoms can be nitrogen or phosphorus atoms. The preferred quaternary salts can be represented by the general formula:

wherein R, the tail group, is a hydrocarbon having greater than or equal to 8 carbon atoms, preferably $C_8$–$C_{30}$, and Q is a cationic head group having a positive charge of x containing at least one heteroatom, x is greater than 0, preferably 1 or 2, y is an integer of 1 to 3, and Z is an anionic counter ion having a negative charge of x.

The term quaternary salts include compounds which have positive charges at the pH level of the emulsion medium. There may be more than one positive charge and the compound may have more than one head group. Nitrogen atom containing quaternary salts include, for example, alkyl ammonium, alkyl pyridinium, alkyl isoquinolium, alkyl imidazolinium and alkyl imidazoline salts. Phosphorus atom containing quaternary salts include, for example, alkyl phosphonium salts, aryl phosphonium salts, and aryl alkyl phosphonium salts. There can be one or more heteroatom in the head group. The quaternary salt may contain inert substituents such as ethoxylates and propoxylates. The counter ions can be any negatively charged group such as acetates, sulfates, nitrites, and halides such as chloride, bromide and iodides. The quaternary salt surfactant additives may or may not emulsify the emulsion system of the invention by itself.

The preferred alkyl ammonium salts can be represented by the general formula:

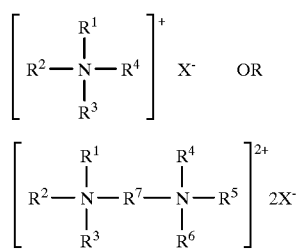

wherein $R^1$, $R^2$, $R^3$, $R^4$, $R^5$, and $R^6$ are independently a hydrocarbyl group such as alkyl, aryl, alkylaryl, arylalkyl and alkoxylates and provided one or more of $R^1$, $R^2$, $R^3$, $R^4$, $R^5$, and $R^6$ is a hydrocarbon group such as linear and/or branched alkyl, having at least 8 carbon atoms, preferably 8 to 30 carbon atoms, more preferably 12 to 22 carbon atoms as the tail group, preferably the hydrocarbyl group is a $C_1$ to $C_{30}$ hydrocarbyl group, and $R^7$ is a divalent hydrocarbyl group, and X is an anionic counter ion described above.

The preferred alkyl pyridinium or isoquinolium salts can be represented by the general formula:

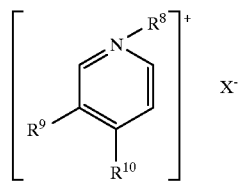

wherein $R^8$ is a hydrocarbon having at least 8 carbon atoms, preferably at least 8 carbon atoms to 30 carbon atoms, more preferably 12 to 22 carbon atoms as the tail group, $R^9$ and $R^{10}$ are hydrogen or together form a fused ring, X is an anionic counter ion described above.

The preferred alkyl imidazolinium and imidazoline salts can be represented by the general formula:

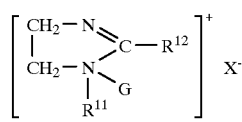

wherein

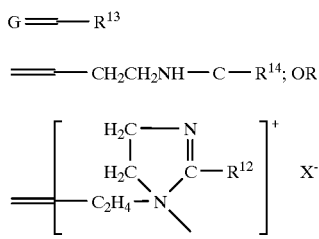

wherein $R^{11}$, $R^{12}$, $R^{13}$, and $R^{14}$ are independently a hydrocarbyl group such as alkyl, aryl, alkylaryl, arylalkyl and alkoxylates and provided one or more of $R^{11}$, $R^{12}$, $R^{13}$, and $R^{14}$, is a hydrocarbon group such as linear and/or branched alkyl, having at least 8 carbon atoms, preferably 8 to 30 carbon atoms, more preferably 12 to 22 carbon atoms as the tail group, preferably the hydrocarbyl group is a $C_1$ to $C_{30}$ hydrocarbyl group, and X is an anionic counter ion described above.

The preferred alkyl phosphonium salts can be represented by the general formula:

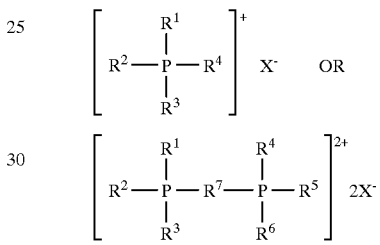

wherein $R^1$, $R^2$, $R^3$, $R^4$, $R^5$, and $R^6$ are independently a hydrocarbyl group such as alkyl, aryl, alkylaryl, arylalkyl and alkoxylates and provided one or more of $R^1$, $R^2$, $R^3$, $R^4$, $R^5$, and $R^6$ is a hydrocarbon group such as linear and/or branched alkyl, having at least 8 carbon atoms, preferably 8 to 30 carbon atoms, more preferably 12 to 22 carbon atoms as the tail group, preferably the hydrocarbyl group is a $C_1$ to $C_{30}$ hydrocarbyl group, and $R^7$ is a divalent hydrocarbyl group, and X is an anionic counter ion described above.

Examples of the quaternary salts include alkylammonium salts such as cocoalkyltrimethylammonium chloride, soyaalkyltri-methylammonium chloride, tallowalkyltrimethylammonium chloride, dodecyltrimethylammonium chloride, hexadecyltrimethyl ammonium chloride, octadecyl-trimethylammonium chloride, 2-ethylhexyl-(hydrogenated tallow)alkyldimethylammonium methosulfate, didecyldimethylammonium chloride, dicocodimethylammonium nitrites, dicocoalkyldimethyl chlorides, ditallowalkyldimethyl chlorides, dihydrogenated tallowalkyldimethyl ammonium chloride, dioctadecyldimethyl chloride, trihexadecylmethylammonium chloride, cocoalkylmethyl [ethoxylated (2)] chloride, tallowalkyl-ethyoxylated (2) acetates, cocoalkylmethyl [ethoxylated (2)] nitrate, benzyldimethyl($C_{12}$–$C_{18}$)alkylammonium chloride, benzyldimethylcocoalkyl ammonium chlorides, benzyldimethyl(hydrogenated tallow)alkyl ammonium chlorides, benzylmethyldi(hydrogenated tallow) alkylammonium chlorides, N-tallow pentamethyl propane diammonium dichloride; alkyl-pyridinium salts such as dodecyltrimethyl pyridinium chloride, bi(cetylpyridinium) dichloride, distearyl pyridinium chloride, lauryl pyridinium chloride and hexadecylpyridinium chloride; alkylisoquinolium salts such as lauryl isoquinolium bromide; alkylphosphonium salts such as hexadecyl-tri-n-butylphosphonium bromide; and alkylimidazolinium salts such as methyl-1-hydro.tallow amido ethyl-2-hydr., tallow imidazolinium methylsulfate, diethyl heptadecyl imidazolinium ethylsulfate; and alkylimidazolline salts.

Some specific examples of commercially available quaternary salts include, for example, alkyl ammonium salts such as VARIQUAT® quaternaries B345, 50 MC, 80 MC LC 80, 60 LC, E228, E290, K300, K375; VARISOFT® quaternaries SDC, ADOGEN® quaternaries 415, 441, 444, 461, 471, R-6, 432, 434, 436, 442,462, 470, 477, 137, 464; AEROSURF® quaternaries TA-100 (from Sherex Chemical Co., Inc.); ARAQUAD® salts C-33W, C-50, S-50, T-27W, 12-50, 16-29W, 16-50, 18-50, HTL8(W) MS-85, 210-50, 2C-70 Nitrite, 2C-75, 2T-75, 2HT-75, 218-75, 218-100, 316(W), B-100, DMCB-80, DMHTB-75, M2HTB-80; DUOQUAD® salts T-50, O-50 (from Akzo); ETHOQUAD® salts C-12-75, C12 $NO_3$, C/12W, C/12B, C/25, O/12, 18/12, 18/25, T/12, T13-50 (from Akzo); ETHODUOQUAD® salts T/15-50; PROPOQUAD® salts 2HT/11 and T/12 and imidozilinium salts such as VARISOFT® quaternaries 445, 475, 3690, 6112 (from Sherex Chemical Co., Inc.).

The amount of surfactant system must be such that a water-in-oil high internal phase emulsion will form. Generally, the surfactant system is present in an amount effective to form a water-in-oil high internal phase emulsion (HIPE). Preferably, the surfactant system can be present from about 0.1 to about 40 weight percent, more preferably about 0.1 to about 25 weight percent based on the monomers. When saccharide fatty acid esters are used as component (a), the saccharide fatty acid surfactants are preferably present from about 0.1 weight percent to about 36 weight percent, more preferably from about 0.1 to about 25 weight percent based on the monomers. When sorbitan fatty acid esters are used as component (a), the sorbitan fatty acid ester surfactants are preferably present from about 2 weight percent to about 36 weight percent, more preferably from about 5 weight percent to about 25 weight percent based on the monomers.

The ratio of primary surfactant component (a) to co-surfactant component (b) is preferably within the range of from about 100:1 to about 1:2. When a non-emulsifying co-surfactant is used as component (b), the ratio of (a) to (b) is preferably within the range of from about 100:1 to about 5:1. For emulsifying co-surfactant, larger amount of component (b) can be used and in some cases preferable depending on the desired foam properties. A co-surfactant is non-emulsifying when the co-surfactant does not form a water-in-oil high internal phase emulsion of at least 30:1 water to oil ratio by itself as a surfactant. Examples of non-emulsifying co-surfactants include, for example, dodecyltrimethyl ammonium chloride; coco alkylbis[2-hydroxyethyl]methyl ammonium chloride; N,N,N',N',N,'-penta(2-hydroxyethyl)-N-tallowalkyl-1,3-propane diammonium diacetates; and oleylmethyl [ethoxylated(2)] ammonium chloride.

The relative amounts of the aqueous phase containing water and an electrolyte and monomer phase containing monomer mixtures and surfactants used to form the high internal phase emulsions are a factor in determining the structural, mechanical and performance properties of the resulting polymeric foams. The ratio of water and oil in the emulsion can influence the density, cell size, and specific surface area of the foam products. To form a polymeric foam product with suitable density and high absorption capacity, the water-in-oil high internal phase emulsion (HIPE) typically contains as the internal phase, at least about 90 weight percent, based on the emulsion, of water, corresponding to a water to oil weight ratio of at least about 9:1, more preferably at least about 95 weight percent of water, most preferably at least about 97 weight percent of water, corresponding to a water to oil weight ratio of at least about 33:1.

The internal aqueous phase can preferably contain a water-soluble electrolyte to stabilize the HIPE and to make the foam more water wettable. Suitable electrolytes include inorganic salts (monovalent, divalent, trivalent or mixtures thereof), for example, alkali metal salts, alkaline earth metal salts and heavy metal salts such as halides, sulfates, carbonates, phosphates and mixtures thereof. Such electrolyte includes, for example, sodium chloride, sodium sulfate, potassium chloride, potassium sulfate, lithium chloride, magnesium chloride, calcium chloride, magnesium sulfate, aluminum chloride and mixtures thereof. Mono- or di-valent salts with monovalent anions such as halides are preferred.

The formation of a water-in-oil high internal phase emulsion is dependent on a number of factors such as the monomers used, water to oil ratio, type and amount of surfactant used, mixing conditions, presence and the amount of water-soluble electrolyte. Unless all of these factors are such that it favors formation of a water-in-oil emulsion, the emulsion will form a oil-in-water emulsion rather than water-in-oil high internal phase emulsion. It has been found that by adding the quaternary salt to a primary surfactant such as sorbitan fatty acid ester or saccharide fatty acid ester, a more stable emulsion can be formed and higher water to oil ratio can be achieved resulting in higher fluid absorption capacity foams.

The formation of a water-in-oil emulsion is described in U.S. Pat. No. 4,522,953, the disclosure of which is herein incorporated by reference. In general, to form the water-in-oil emulsion, the water can be mixed in any way up to a water to oil ratio of about 4:1. An oil-in-water emulsion becomes preferred if the water was added all at once beyond a water to oil ratio of about 4:1. Typically, the water must be added gradually with a moderate rate of shear. A small capacity mixer such as a paint mixer with a shear rate of at least about 5 $s^{-1}$, preferably at least about 10 $s^{-1}$ can be used to mix the water-in-oil emulsion. A larger mixer equipped with an impeller with a shear rate of at least about 10 $s^{-1}$ or a pin gap mixer with a shear rate of at least about 50 $s^{-1}$, preferably at least about 100 $s^{-1}$ can also be used. If the shear rate is too low, the water-in-oil emulsion will revert to a oil-in-water emulsion. It is desirable to at least have a water to oil ratio of about 9:1, preferably at least about 19:1, more preferably at least about 30:1 for a high absorbency capacity foam.

A HIPE can be prepared in batches or continuously. To form a HIPE in batches, the emulsion is formed in a vessel or a container by gradually adding an aqueous phase to a monomer mixture and/or advanced monomer mixture under a moderate rate of shear until the desired water to oil ratio is reached.

A HIPE can be prepared continuously by initially preparing a preformed emulsion of approximately the same character as the desired emulsion by the method described above, then introducing into the preformed emulsion, both the aqueous phase and monomer mixture and/or advanced monomer mixture of the emulsion in such proportions so as to produce the desired emulsion. The emulsified mass is maintained in a state of continuous shear sufficient to reduce the effective viscosity of the mass near to that of the introduced phase but not above the inherent shear stability point of the desired emulsion, and then withdrawing the prepared emulsion at the desired rate.

The aqueous phase and the monomer and/or advanced monomer phase for batch process and continuous process can be introduced in a mixing vessel by an aqueous stream or a monomer stream, respectively, through one or more inlets. The streams can be combined prior to or after entering the mixing vessel then mixed in such a way to produce the desired HIPE. The mixing vessel is any container in which the high internal phase emulsion is made regardless of the type of mixer or mixer head used.

The curable water-in-oil high internal phase emulsions (curable HIPE) can be cured in a batch process or in a continuous process. The emulsion or aqueous stream or monomer stream can be heated prior to or after the addition of the initiator.

In a batch process, the curable HIPE is collected in a suitable container with the desirable shape and cured at a temperature at least about 25° C. for a time effective to polymerize and to cure the monomers. The HIPE is preferably polymerized and cured at a temperature within the range of about 25° C. to about 90° C., as long as the emulsion is stable at the curing temperature. Alternatively, a multiple-step process as described in a U.S. Pat. No. 5,189,070 issued Feb. 23, 1993 can also be used, the disclosure of which is herein incorporated by reference. In the multi-step process the emulsion is pre-cured at a temperature of less than about 65° C. until the emulsion has a Rheometrics dynamic shear modulus of greater than about 500 pascal, (lightly gelled, having a consistency like a jelly or a gelatin referred to as "gel"), then cured at a temperature of above about 70° C. for a time effective to cure the gel. The cure can be as high as about 175° C. under suitable pressure to prevent water from boiling.

The emulsions can be heated, for example, by hot water, hot air, steam, IR, RF, microwave or ohmic heating. The HIPE should be cured until the desired properties are obtained. Typically, to obtain a cured foam, the HIPE should be cured for at least about 8 hours, at 60° C. or at least about 1 hour at 60° C. then 3 hours at a temperature of above about 70° C. Generally, the extent of reaction after curing is at least about 85% of the monomers, preferably at least about 90%, more preferably at least about 95% (i.e., less than about 5% of free monomers), most preferably at least about 99% (i.e., less than about 1% of free monomers) in order to obtain good properties.

These foams can be optionally post-cured to improve the foam properties. Post-curing of the foam can be carried out by heating the foams at a temperature of above about 75° C., preferably greater than 90° C. by steam, hot air or other heating source. Such heating may be performed initially in a heat exchanger, oven, over heated rollers or by other means.

When the temperature is near or above the boiling point of water, pressure is preferably applied to keep the water in the liquid phase. Pressure can be applied to the emulsion, if desired, at a pressure generally from above atmospheric pressure, typically within the range of about atmospheric pressure to about 1.03 MPa (150 psig). When the temperature is about 100° C., a pressure from about 7 to 70 kPa gauge (about 1 to 10 psig) is sufficient; when the temperature is about 130° C., a pressure from about 210 to 480 kPa gauge (about 30 psig to 70 psig) is preferred. The preferred pressures will be from just above the autogenous steam pressure of the solution to about twice that pressure on an absolute pressure basis, i.e., psia.

For example, the emulsion can be cured under pressure by using an autoclave operating under autogenous pressure of steam generated from pure water at a given temperature, by applying nitrogen or air pressure to prevent boiling of the emulsion or by mechanical means, such as rollers, pistons, molds, or the like.

Once the curing and/or post-curing process is completed, the water incorporated in the foam may be removed or squeezed out, dried by heat or flashed by lowering the pressure to a suitable level to evaporate the remaining liquid to give the desired degree of dryness in the product foam. These drying techniques will preferably be used after the desired state of cure is developed in the foam material.

These foams prepared by the inventive process may be washed prior to, after or between drying stages (removing at least a portion of the water) to yield an absorbent block which is especially useful for the absorption of liquids. Typically, these foams are washed to reduce the electrolyte content of the foam with a solvent such as, for example, an alcohol, a low concentration electrolyte solution (lower concentration than the water phase) such as 1% calcium chloride solution or deionized water. The washed foams can be conveniently dried by squeezing the water and/or solvent out of the foams and air or heat drying.

The foams produced by the inventive process possess high absorption capacities and good uniform properties especially suitable for use as liquid absorbent articles such as wipes, diapers and catamenial products for example.

ILLUSTRATIVE EMBODIMENT

The following illustrative embodiments describe the process of the invention and are provided for illustrative purposes and are not meant as limiting the invention.

The surfactants utilized were SPAN® 20 (sorbitan monolaurate) and SPAN® 40 (sorbitan monopalmitate) emulsifying agents from Fluka Chemical Corporation, Aldrich Chemical Company or Imperial Chemical Industries. Surfactant additives utilized were ARAQUAD® 12-37W salts (dodecyltrimethyl ammonium chloride) from Akzo (hereinafter "DTAC"), Ethoquad® O/12 ethoxylated quaternary salt (oleylmethyl [ethoxylated (2)] ammonium chloride) from Akzo, Ethoquad® C12/75 ethoxylated quaternary salt (coco alkylbis(2-hydroxyethyl) methyl ammonium chloride) from Akzo, Ethoduoquad® T15/50 ethoxylated quaternary salt (N,N,N',N',N'-penta (2-hydroxyethyl)-N-tallowalkyl-1,3-propane diammonium diacetates) from Akzo, AROSURF® TA-100 quaternaries (distearyl dimethyl ammonium chloride) from Sherex Chemical, Adogen® 444 (trimethyl cetyl quaternary ammonium chloride) from Sherex Chemical Co., Inc, Miramine® OC (substituted imidazoline of oleic acid) from Rhone Poulenc-Surfactant and Specialty Division. A commercial divinyl benzene containing 55% divinyl benzene from Aldrich Chemical Company was used. The quantity of monomer phase made in one batch was between 1–3 liters.

Washing and Drying Method

The following washing and drying method was used for all of the examples below: After the foam blocks were cured, the blocks were sliced to 0.35 inches (0.89 cm) thickness. Then, each individual slice was placed on a 0.04 inch (0.1 cm) mesh screen between a 9"×6.75" (22.9 cm×17.1 cm) stainless steel plate that allowed the slice to be squeezed to a 0.045 inch (1.14 mm) thickness. The squeezed slices were placed in an Arbor-press made by DAKE and the calcium chloride solution was squeezed out. The slices were then washed and squeezed twice by soaking the slices in 7.6 liters (2 US gallons) of 1% calcium chloride solution and placing in the Arbor-press. Then, after the slices were squeezed, a paper towel was placed on both sides of the washed slices which were squeezed again to remove excess water from the slices. The slices were then placed in an oven at a temperature of 60° C. for 4 hours to dry. The washed and dried foam slices were analyzed for physical properties as discussed below.

TESTING METHODS

Free Swell ("FS")/Percent Recovery/Foam Density ("PD")/Percent Strain/Resistance to Compression Deflection ("RTCD")/Swell Ratio:

A 2"×2" (5.08×5.08 cm) square is cut from a foam slice. The thickness of the foam sample is measured while it is dry ("dry thickness") using a dead weight thickness gage (a digital linear gage model EG-225 made by Ono Sokki) exerting 50 grams force applied to a 1.60" diameter disk. This thickness is called the "caliper." The foam square is soaked in warm 88° F. (31° C.) Syn-Urine from Jayco for 17 minutes. From the 2"×2" (5.08×5.08 cm) square, a circle of 1.129" (2.868 cm) diameter is cut. This disk is re-equilibrated in the Syn-Urine for 5 minutes. The wet disk is then weighed ("initial wet weight").

The thickness of the wet sample is measured using the same load gage ("initial wet caliper"). The disk is then placed under a 0.74 psi stress where stress is the total dead weight applied to the gage divided by the cross-sectional area. The thickness of the disk is measured under this stress after 15 minutes ("wet caliper"). After 15 minutes, the specimen disk is weighed to measure the retained fluid.

The excess urine is squeezed from the disk and the remainder of the square from which it was cut. The foam is placed in boiling deionized water for 15 minutes. The foam is washed this way several times to remove inorganics. The foam is then removed, blotted dry, then placed in a vacuum oven at 60–70° C. and dried until the foam has fully expanded. The weight of the dry disk sample is then determined in grams ("final dry weight").

The following values were calculated from the above measurements.

Free swell=initial wet weight/final dry weight
Resistance to Compression Deflection ("RTCD")=wet weight after load at 15 minutes/final dry weight
Swell Ratio=RTCD/Free swell×100

$$\% \text{ Strain} = \frac{\text{initial wet caliper} - \text{wet caliper}}{\text{initial wet caliper}} \times 100$$

Foam Volume (cm$^3$)=(diameter/2)$^2$×3.142× initial wet caliper based on a 1.129" diameter circle cut (in cm)
Foam Density (mg/cm$^3$)=final dry weight×1000/Foam Volume % Recovery=dry thickness/initial wet caliper×100
Vertical Wicking Rate ("VWR"):

From a foam slice, cut at 0.35 inches (0.89 cm) thickness, a 1 to 2 cm wide strip is cut, greater than 5 cm in length. The strip of foam is clamped or taped to a metal ruler, with the bottom of the foam strip flush with the 0 mark on the ruler. The ruler and foam are placed in a container of approximately 100 ml Syn-Urine from Jayco, in an incubator at 99° F. (37° C.) so the bottom of the strip (0 mark) is barely touching the surface of the Syn-Urine (less than 1 mm). The Syn-Urine is dyed with food coloring to more easily monitor its absorption and rise in the foam. A stopwatch is used to measure the time required for the liquid level to reach 5 cm vertical height in the foam sample.

Percent Free Liquid:

The amount of unabsorbed water was measured by decanting fluid from the foam in the container after pre-curing or curing stage and weighing the decanted fluid.

Solidity Test:

A flat-tipped probe of about 6 mm diameter is placed on top of an advanced monomer mixture to create a pressure at the flat-tip of about 2.1 kPa (0.3 psi). The ease and penetration of the object into the gel was measured. The monomer mixture is considered solid when the object no longer penetrates or penetrates less than about 1 mm.

Viscosity:

At selected times, aliquots of approx. 5 ml are removed and placed in 8 dram vials. If the aliquots are above ambient temperature, the aliquots are then quickly cooled in wet ice to ambient temperature (approx. 24° C.). The aliquots are chilled in acetone/dry ice slush bath for approx. 10 minutes to a temperature of approx. −78° C. The warm aliquots may be chilled immediately to approx. −78° C. While the aliquots are kept cold, the viscosity is run using Brookfield Viscometer, Model RVTD equipped with a #6 Spindle (manufactured by Brookfield Engineering Lab, Stoughton, Mass.).

EXAMPLES 1–5

For each Example, 2 milliliters (ml) of styrene, 2 ml of divinylbenzene, 6 ml of 2-ethylhexylacrylate were mixed together with a surfactant and heated to 40° C. In Examples 1 and 2 (comparative examples), 1.06 grams (g) and 0.53 g respectively of SPAN® 20 emulsifying agent were used as the surfactant. These proportions correspond to 12 phr (parts of surfactant to 100 parts of monomer on a weight basis) and 6 phr respectively. In Examples 3, 4, and 5, 0.53 g of SPAN® 20 emulsifying agent and 0.009 g, 0.035 g and 0.088 g respectively of DTAC (0.1 phr, 0.4 phr and 1.0 phr, respectively) were used as the surfactant. 10 ml of the solution was then transferred to a 500 ml beaker submersed in a 45° C. water bath. A double bladed paint stirrer was positioned into the beaker and the speed was adjusted to 300 revolutions per minute.

An aqueous solution was prepared containing 10% wt calcium chloride and 0.15% wt of potassium persulfate in deionized water. The aqueous solution was heated to 40° C. and 400 ml was added dropwise into the beaker containing the monomer and surfactant over a 30 minute period. The presence of SPAN® 20 emulsifying agent and DTAC in the monomer mixture stabilized a higher internal water-in-oil emulsion. The emulsion had a creamy white appearance.

Foams were prepared by transferring the emulsion to a sealed plastic container and placing the container in an oven at 70° C. for 24 hours. Then, the container was taken out of the oven and the amount of free water in the container was measured. The percent free water indicates the amount of emulsion breakage during curing. Smaller percentages of free water are obtained for more effective emulsifiers and correspond to better foam properties.

A comparison of percent free water based on total water added is shown in Table 1 below with various amounts of the primary surfactant and co-surfactant added. Water to oil ratio by volume is listed as "W:O".

TABLE 1

| EXAMPLE | SPAN® 20 (phr) | DTAC (phr) | W:O Ratio | % Free Liquid |
|---------|----------------|------------|-----------|---------------|
| 1 | 12 | 0 | 40:1 | 3.8 |
| 2 | 6 | 0 | 40:1 | >75 |
| 3 | 6 | 0.1 | 40:1 | 13.1 |
| 4 | 6 | 0.4 | 40:1 | 4.6 |
| 5 | 6 | 1.0 | 40:1 | >75 |

As can be seen from Table 1, Example 2, SPAN® 20 alone at a concentration of 6 phr was not effective in stabilizing a high internal phase emulsion which could be cured into a foam. By contrast, the emulsion is stabilized by adding DTAC to the monomer mixture in addition to SPAN® 20 as the surfactant as in Examples 3 and 4, 0.1 and 0.4 phr, respectively. Example 5 demonstrates that when the ratio of co-surfactant to primary surfactant becomes too great, emulsion stability decreases.

EXAMPLES 6–9

Foams were prepared in a similar procedure to Example 1, except 300 ml of the aqueous solution was mixed into 10 ml of a monomer plus surfactant solution.

Surfactants listed in Table 2 were added in an amount listed in Table 2.

TABLE 2

| EXAMPLE | SPAN ® 20 (phr) | cosurf. (phr) | W:O ratio | % Free Liquid |
|---|---|---|---|---|
| 6 | 6 | — | 30:1 | >75 |
| 7 | 6 | Ethoquad ® O/12 0.4 | 30:1 | 3.0 |
| 8 | 6 | Ethoquad ® C/12–75 0.4 | 30:1 | 7.7 |
| 9 | 6 | Ethoduoquad ® T15/50 0.4 | 30:1 | 8.7 |

As can be seen from Table 2, Example 6, SPAN® 20 alone at a concentration of 6 phr was not effective in stabilizing a high internal phase emulsion which could be cured into a foam. By contrast, the emulsion is stabilized by adding 0.4 phr of the co-surfactant to the emulsion in addition to SPAN® 20 as in Examples 7, 8 and 9.

EXAMPLE 10–17

A monomer solution consisting of 20 parts styrene, 20 parts divinylbenzene, and 60 parts 2-ethylhexylacrylate by volume was prepared. SPAN® 20 emulsifying agent and DTAC in the amounts listed in Table 3 were mixed into the monomer solution and allowed to settle overnight. (Examples 10, 11, 15 and 17 are comparative examples). A sludge layer formed at the bottom of the surfactant-monomer solution in Example 10, 11, and 15. Much smaller sludge layers were observed at the bottom of the surfactant-monomer solution in Examples 12, 13, and 16. No sludge layers were visible at the bottom of the surfactant monomer solutions of Examples 14 and 17. The surfactant-monomer solution (oil phase) for Examples 10–13, 15 and 16 were decanted away from the sludge layers. An aqueous solution containing 10 weight percent calcium chloride and 0.15 weight percent potassium persulfate was also prepared.

The aqueous and oil phases were combined at a weight ratio of 30 parts aqueous phase to 1 part oil phase by volume using an Edge Sweets pin mill mixing machine incorporating a 1 hp motor belt driving a 6" long 1 ½" diameter pin mill with 12 layers of pins on the central rotor, 0.02" clearance between rotor and barrel, and fitted with flow meters and thermocouples for monitoring, to form the high internal phase water-in-oil emulsions. Oil phase (monomers and surfactants) were metered and controlled by a model 184-56C magnetic drive pump made by Micropump Corporation. Water phase flow was controlled by a similar pump of greater capacity (model 120-56C made by Micropump Corp.). The maximum oil flow in the configuration is 0.04 lbs/min; the maximum water phase (water, salt and potassium persulfate initiator) flow is 1.20 lbs/min. Control based on flow rates and/or pump RPM is provided by software in an Eaton IDT FACTORY MATE control computer and an Allen-Brodley PLC-5 programmable logic controller.

A 10 gallon tank fitted with an air motor stirrer was used to mix aqueous internal phase. The oil phase was externally mixed by shaking or with a stirrer bar. The water phase was fed directly from mixing tank by the pump. The oil pump reservoir is a 1 liter steel tank.

In a typical run procedure, the pin mill is mounted and filled with oil phase. The flow of water and oil is started with the pin mill spinning typically at 2000 RPM. Typical conditions to establish emulsions are a water to oil feed ratio of 2:1 to 10:1 (i.e., low water to oil ratio), temperatures at mix heads of 25° C. to 65° C., feed rates of oil and water of 0.05 to 0.50 lbs/min, pin mill rotation rates of 1500 to 3000 RPM, emulsion flow rates of 0.3 to 1.2 lb/min, pin mill length of 6" to 18" and pin/barrel clearance of 0.05 to 0.02". Flow rate, pin mill length, pin/barrel clearance, RPM and temperature are adjusted to give the smoothest emulsions with most uniform back-pressure through the pin mill. Total flowrate, RPM and temperature at mix head are listed in Table 3.

Following establishment of a smooth emulsion at low water to oil ratio, the ratio was raised to the desired value as shown in Table 3 by increasing the water flow and/or decreasing the oil flow.

The emulsion was let out of the pin mill mix-head through a static mixer to complete emulsion homogenation. After the desired emulsion conditions are reached, the emulsion was collected in 6 lb sample containers at a flow rate of 0.3 to 1.20 lb/min and cured in an oven at a temperature of 70° C. for 24 hours.

When sweating of the emulsion occurred during increasing the water to oil ratio, the flow rate was adjusted upward, RPM adjusted, and the water to oil ratio was further increased until operation stabilizes at a uniform back-pressure with greater homogeneity. At this point, the emulsion is normally stabilized in a structure which will persist with low back-pressure throughout variations of the water to oil ratio and flow rates to desired levels.

The percent free liquid was measured and listed in Table 3 below.

TABLE 3

| EX. | SPAN (phr) | DTAC (phr) | W:O Ratio | Flowrate (lb/min) | RPM | Mix Temp (° C.) | % Free Liquid |
|---|---|---|---|---|---|---|---|
| 10 | 12 | 0 | 30 | 0.85 | 2500 | 45 | 3.1 |
| 11 | 6 | 0 | 30 | 0.85 | 2500 | 49 | 33.0 |
| 12 | 6 | 0.1 | 30 | 0.85 | 3000 | 47 | 7.2 |
| 13 | 6 | 0.1 | 30 | 0.40 | 2000 | 48 | 7.6 |
| 14 | 6 | 0.4 | 30 | 0.31 | 2000 | 49 | 3.2 |
| 15 | 12 | 0 | 40 | 0.85 | 3005 | 48 | 5.0 |
| 16 | 12 | 0.1 | 40 | 0.85 | 2750 | 48 | 3.1 |
| 17 | 12 | 1.0 | 40 | 0.85 | 2750 | 48 | 1.8 |

TABLE 3A

| EXAMPLE | STRAIN @ 15 MIN | RTCD (g/g) | FD (mg/cm$^3$) | FS (g/g) | VWT (sec.) |
|---|---|---|---|---|---|
| 10 | 38.1 | 17.0 | 32.4 | 27.4 | 183 |
| 11 | 30.6 | 9.1 | 41.0 | 11.6 | >600 |
| 12 | 43.6 | 19.9 | 31.9 | 30.0 | 221 |
| 13 | 47.1 | 17.6 | 29.6 | 29.5 | 220 |
| 14 | 19.6 | 23.4 | 30.0 | 27.7 | 103 |
| 15 | 72.6 | 11.9 | 21.5 | 36.7 | 133 |
| 16 | 65.8 | 13.9 | 22.9 | 37.4 | >600 |
| 17 | 71.0 | 15.4 | 20.9 | 41.6 | >600 |

Foam property data is summarized in Table 3A.

As can be seen from Table 3, Example 11, SPAN® 20 alone at a concentration of 6 phr was not effective in stabilizing a high internal phase emulsion which could be cured into a foam. By contrast, the emulsion is stabilized by adding respectively 0.1 phr, 0.1 phr and 0.4 phr of DTAC to the emulsion in addition to 6 phr of SPAN® 20 as the surfactant as in Examples 12, 13 and 14. Dodecyltrimethyl ammonium chloride is a non-emulsifying surfactant and a stable emulsion can not be formed with dodecyltrimethyl ammonium chloride without a primary surfactant.

As can be seen from (comparative) Example 15, at higher water to oil ratio of 40:1, percent free liquid is higher then at water to oil ratio of 30:1 as can been seen from comparison with Example 10. At higher water to oil ratio higher concentration of the SPAN® 20 appears required for similar performance. By adding 0.1 phr and 1.0 phr of dodecyltrimethyl ammonium chloride, the percent free liquid decreased for a 40:1 water to oil ratio emulsion.

EXAMPLE 18

Six jars were prepared, each containing 10 ml of styrene, 10 ml of divinylbenzene, 30 ml of 2-ethylhexylacrylate, and 6 g of SPAN® 20 emulsifying agent. DTAC was added to five of the jars in the following amounts: 0.125 g, 0.25 g, 0.375 g, 0.5 g, 0.75 g. The six jars were mixed and placed in a water bath at 50° C. for 30 minutes. After removing the jars from the water bath they were placed on the benchtop, overnight at ambient temperature, to allow sludge from the SPAN® 20 emulsifying agent to settle out. Solutions in the jars were then decanted away from the sludge. Excess solvent remaining in the jars was removed by placing the jars in a vacuum oven at 60° C. for 8 hours. The weight of sludge in each of the jars was then measured. Table 4 summarizes the experimental results. The amount of sludge which settled out in each jar is expressed as a weight percent of the original amount of SPAN® 20 emulsifying agent added to the jar. It was found that DTAC was effective in preventing the formation of a sludge layer.

TABLE 4

| SPAN ® 20 (g) | DTAC (g) | % wt. sludge (basis SPAN ® 20) |
| --- | --- | --- |
| 6 | 0 | 9.5 |
| 6 | 0.125 | 7.3 |
| 6 | 0.25 | 5.5 |
| 6 | 0.375 | 1.8 |
| 6 | 0.5 | 1.5 |
| 6 | 0.75 | 0.0 |

EXAMPLES 19–29

An oil mixture (monomer mixture) of 20 weight percent styrene, 20 weight percent divinyl benzene and 60 weight percent 2-ethylhexylacrylate was made. An aqueous solution of 10% calcium chloride was made. For each Example 600 cc of the aqueous solution was heated to 40° C., then 0.15 weight percent of potassium persulfate was added. These aqueous solutions were then slowly added to a mixture of oil mixture (monomer mixture) to reach the desirable water to oil ratio ("W:O Ratio") and surfactants, SPAN® 20 emulsifying agent ("SPAN") and/or AROSURF® TA-100 ("TA-100") quaternaries, in the amount listed in Table 5. Mixing was done with an air driven paint stirrer and was continued several minutes after the addition was complete. The resulting emulsions were poured into two pint polyethylene tubs and covered with a lid. The tubs were cured for 22–24 hours in a 60° C. incubator. The free liquids were measured and listed in Table 5 and foam properties are listed in Table 6.

TABLE 5

| EXAMPLE | SPAN (phr) | TA-100 (phr) | W:O Ratio | % Free Liquid |
| --- | --- | --- | --- | --- |
| 19 | 3 | 0 | 30:1 | 95 |
| 20 | 0 | 3 | 30:1 | 38.71 |
| 21 | 1.6 | 1.5 | 30:1 | 1.24 |
| 22 | 1.6 | 1.6 | 40:1 | 6.54 |
| 23 | 1.5 | 1.6 | 50:1 | 8.68 |
| 24 | 3.1 | 3.1 | 30:1 | 1.94 |
| 25 | 6 | 6 | 30:1 | 3.23 |
| 26 | 5 | 0.6 | 30:1 | 57.12 |
| 27 | 10 | 2 | 30:1 | 4.65 |
| 28 | 2 | 10 | 30:1 | 8.39 |
| 29 | 0.5 | 0.5 | 30:1 | 57.12 |

TABLE 6

| EXAMPLE | STRAIN @ 15 MIN | RTCD (g/g) | FD (mg/cm$^3$) | FS (g/g) | VWT (sec) |
| --- | --- | --- | --- | --- | --- |
| 19 | * | * | * | * | * |
| 20 | 38.8 | 12.2 | 38.3 | 16.8 | 445 |
| 21 | 37.5 | 19.9 | 31.5 | 28.8 | >10 min. |
| 22 | 61.3 | 16.9 | 22.8 | 35.7 | >10 min. |
| 23 | 55.9 | 18.2 | 25.4 | 34.5 | >10 min. |
| 24 | 37.3 | 19.3 | 32.7 | 27.9 | >10 min. |
| 25 | 53.5 | 15.0 | 31.4 | 27.3 | >10 min. |
| 26 | 73.9 | 12.0 | 19.4 | 26.4 | >10 min. |
| 27 | 65.9 | 19.6 | 24.7 | 36.5 | >10 min. |
| 28 | 54.6 | 13.5 | 38.1 | 25.1 | >10 min. |
| 29 | * | * | * | * | * |

*Foam could not be tested due to high percent free liquid value and poor quality of the remaining polymeric material.

EXAMPLES 30–40

Samples were prepared as in Examples 19–29, using MIRAMINE® OC surfactant (an imidazoline of oleic acid) along with SPAN® 20 instead of AROSURF® TA-100. Table 7 below lists the amount of each surfactant, water to oil ratio, and percent free liquid in the cured foam, and the properties of the cured foams are listed in Table 8.

TABLE 7

| EXAMPLE | SPAN ® 20 (phr) | MIRAMINE OC (phr) | W:O Ratio | % Free Liquid |
| --- | --- | --- | --- | --- |
| 30 | 10. | 2. | 30 | 1.92 |
| 31 | 10. | 2. | 30 | 49.94 |
| 32 | 3. | 1. | 40 | 61.15 |
| 33 | 3. | 2. | 40 | 9.71 |
| 34 | 4. | 1. | 40 | 60.78 |
| 35 | 4. | 2. | 30 | 40.91 |
| 36 | 8. | 4. | 30 | 0. |
| 37 | 8. | 4. | 30 | 5.85 |
| 38 | 5. | 1. | 30 | 58.53 |
| 39 | 5. | 2. | 30 | 12.5 |
| 40 | 6. | 2. | 50 | 15.62 |

TABLE 8

| EXAMPLE | STRAIN @ 15 MIN | RTCD (g/g) | FS (g/g) | VWT (sec) |
| --- | --- | --- | --- | --- |
| 30 | 39. | 11.2 | 17.7 | 110 |
| 31 | 72.4 | 12.9 | 34.7 | 62 |

TABLE 8-continued

| EXAMPLE | STRAIN @ 15 MIN | RTCD (g/g) | FS (g/g) | VWT (sec) |
|---|---|---|---|---|
| 32 | 43.5 | 5.9 | 13.5 | >600 |
| 33 | 68. | 11.5 | 34.2 | 122 |
| 34 | 19.7 | 9.1 | 10.4 | 168 |
| 35 | 28.4 | 13.5 | 18.4 | 89 |
| 36 | 73.7 | 12.3 | 24.4 | 30 |
| 37 | 33.4 | 17.2 | 24.0 | 1o0 |
| 38 | 22.2 | 7.8 | 10.8 | 180 |
| 39 | 46.6 | 15.7 | 28.9 | 130 |
| 40 | 7.5 | 37.5 | 40.3 | 55 |

The monomer composition of sample 40 was 30% wt styrene, 30% wt divinylbenzene, and 40% 2-ethylhexylacrylate rather than the 20/20/60 monomer composition of the other examples. Examples 35 and 36, in particular, would be excellent materials for an acquisition layer of a diaper because of a low wicking time. Examples 30 and 36 were cured in an autoclave at about 140° C. for a time period of four hours. These two examples demonstrate that the surfactant composition of these examples stabilize the emulsion at this temperature for a time period sufficient to cure the foam, and that a significantly shorter curing time is acceptable. Examples 31–35, and 38–40 demonstrate that the surfactant composition of these examples stabilize the emulsions at lower concentrations than prior art surfactant compositions.

We claim:

1. A process for the production of a porous crosslinked polymeric material comprising:
   (a) providing a water-in-oil emulsion comprising (i) a mixture of polymerizable monomers comprising at least one oil-soluble vinyl monomer and from about 2 to about 70 weight percent, based on the mixture, of a multifunctional unsaturated crosslinking monomer, (ii) at least 90 weight percent, based on the emulsion, of water as the internal phase (iii) an effective amount to produce the water-in-oil emulsion of a surfactant comprising (A) at least one sorbitan fatty acid ester or saccharide fatty acid ester and (B) at least one quaternary salt having at least one greater than or equal to 8 carbon atoms hydrocarbon group, and (iv) a polymerization initiator;
   (b) curing said polymerizable monomers under conditions effective to polymerize and crosslink the polymerizable monomers; and
   (c) removing at least a portion of water from said crosslinked emulsion thereby producing a porous crosslinked polymeric material.

2. The process of claim 1 wherein the quaternary salt is a quaternary salt having at least one $C_8$–$C_{30}$ hydrocarbon group.

3. The process of claim 2 wherein the quaternary salt is a quaternary salt having one or more phosphorus or nitrogen atom containing head group.

4. The process of claim 1 wherein the quaternary salt can be represented by a formula:

$$\{Q\}^{x+}R_yZ^{x-}$$

wherein R is a hydrocarbon having greater than or equal to 8 carbon atoms, Q is a cationic head group having a positive charge of x and having at least one heteroatom, x is greater than 0, y is an integer of 1 to 3, and Z is an anionic counter ion having a negative charge of x.

5. The process of claim 4 wherein the ratio of component (iii)(A) to component (iii)(B) is within the range of from about 100:1 to about 1:2.

6. The process of claim 5 wherein the quaternary salt is selected from the group consisting of alkylammonium, alkyl- pyridinium, alkylisoquinolium, alkylimidazolinium, alkylimidazoline, alkylphosphonium, and alkyl sulfonium.

7. The process of claim 5 wherein the surfactant is present in an amount from about 0.1 to about 40 weight percent based on the polymerizable monomers.

8. The process of claim 6 wherein the ratio of component (iii)(A) to component (iii)(B) is within the range of about 100:1 to about 1:2.

9. The process of claim 7 wherein the component (iii)(A) comprises at least one sorbitan fatty acid ester.

10. The process of claim 9 wherein the component (iii)(A) is present in an amount from about 2 to about 36 weight percent based on the polymerizable monomers.

11. The process of claim 7 wherein the component (iii)(A) comprises at least one saccharide fatty acid ester.

12. The process of claim 11 wherein the saccharide fatty acid ester is a fatty acid ester of a saccharide having the formula $C_n(H_2O)_{n-r}$, wherein r is an integer from 0 to 3 and $3(r+1)<n<10(r+1)$.

13. The process of claim 12 in which the saccharide fatty acid ester is partially alkylated in the hydroxyl positions of the saccharides.

14. The process of claim 3 in which the vinyl monomer is selected from the group consisting of monoalkenyl arenes, acrylate or methacrylate esters, conjugated diolefins, allenes, olefin halides and mixtures thereof.

15. The process of claim 14 in which the multifunctional unsaturated crosslinking monomer is a monomer having at least two functionality selected from the group consisting of vinyl groups, acrylate groups and methacrylate groups.

16. The process of claim 15 in which the water-in-oil emulsion comprises as the internal phase, at least about 95 weight percent, based on the emulsion, of water.

* * * * *